(No Model.)
M. W. LEONHARDT.
MACHINE FOR HULLING OATS OR COTTON SEED.
No. 425,331. Patented Apr. 8, 1890.
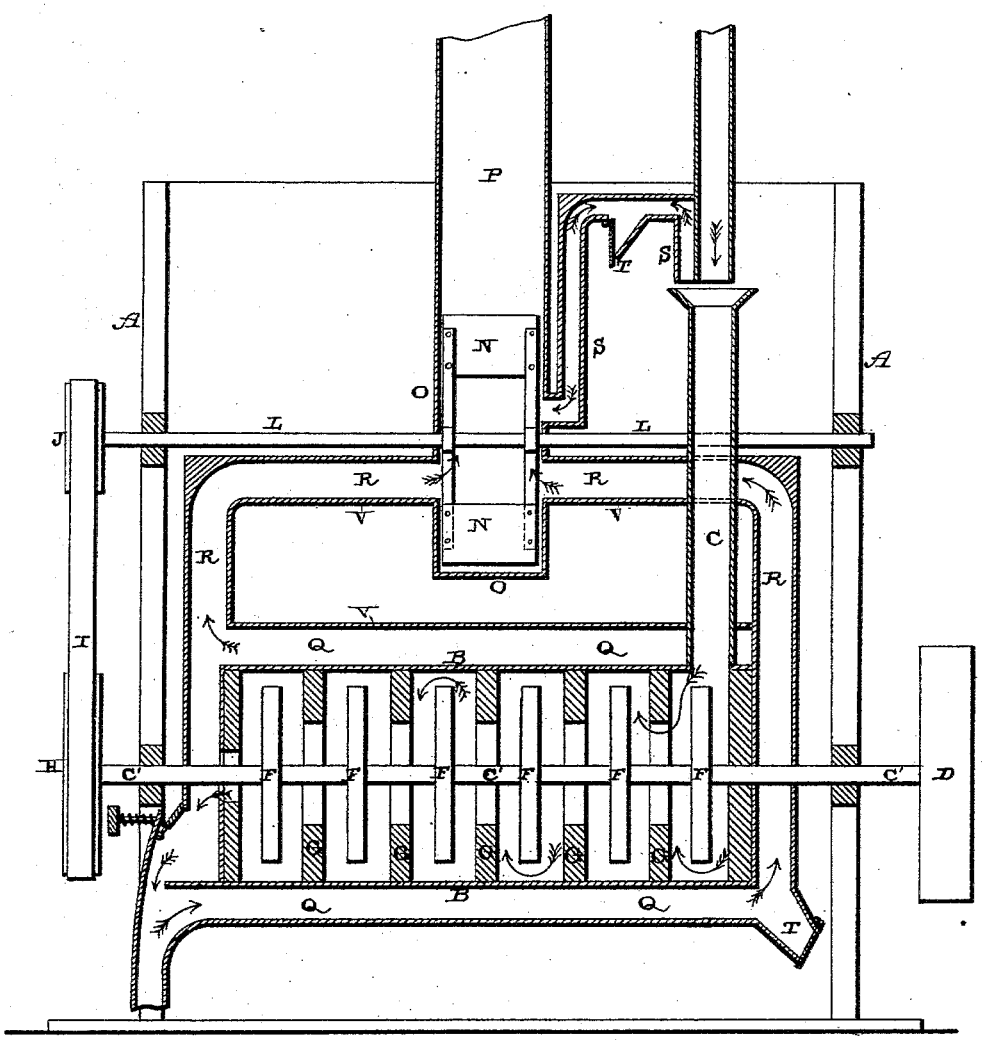
Witnesses:
E. P. Ellis,
B. Brooken,
Inventor:
M. W. Leonhardt
per
F. A. Lehmann,
atty.

UNITED STATES PATENT OFFICE.

MARTIN WILLIAM LEONHARDT, OF ST. LOUIS, MISSOURI.

MACHINE FOR HULLING OATS OR COTTON-SEED.

SPECIFICATION forming part of Letters Patent No. 425,331, dated April 8, 1890.

Application filed December 30, 1889. Serial No. 335,336. (No model.)

*To all whom it may concern:*

Be it known that I, MARTIN WILLIAM LEONHARDT, of St. Louis, in the State of Missouri, have invented certain new and useful Improvements in Machines for Hulling Oats or Cotton-Seed; and I do hereby declare the following to be a full, clear, and exact description of the invention, such as will enable others skilled in the art to which it pertains to make and use it, reference being had to the accompanying drawing, which forms part of this specification.

My invention relates to machines for hulling oats or cotton-seed; and it consists in the combination and arrangement of parts, which will be more fully described hereinafter, and particularly pointed out in the claim.

The object of my invention is to provide a machine for hulling oats or cotton-seed, and in which the hulls are taken off the seed by being passed horizontally through a cylinder in which are placed stationary and revolving emery disks or plates, and from which cylinder the hulls are drawn away by a fan provided for this purpose, the construction being such that the cylinder is surrounded by a chamber, which is connected with the exit-passage below and above the cylinder, and this chamber connected at each end by flues which connect with a fan-chamber, and to connect the fan-chamber with the upper end of the inlet-pipe, whereby the material is subjected to a suction-blast before it enters the hulling-cylinders, and from above and below as it passes from the hulling-cylinder for removing dust from the material before it enters the cylinder, and separating the hulls from the kernels after it has been subjected to the hulling action in the cylinder.

The accompanying drawing represents a vertical section of a machine which embodies my invention.

A represents a suitable inclosing case or frame, in the lower portion of which is placed a horizontal cylinder B, into which the seeds are discharged at one end through the conductor C. Passing horizontally through the frame A and the cylinder B is the driving-shaft C', provided with the driving-pulley D upon one end, and to which, inside of the cylinder, is secured the vertically-revolving emery plates or disks F, or of any suitable material or construction that may be preferred.

Secured to the inner sides of the cylinder B, which is made of sheet-steel or any other suitable material, are the stationary emery disks or plates G, which have openings formed through their centers of sufficient size to permit the shaft C' and the grain which is being hulled to pass freely through toward the opposite end of the cylinder from which they were admitted through the conductor C. These emery-disks F G are placed in the cylinder at a suitable distance apart, and when the shaft C' is made to revolve the revolving disks F force the grain from the delivery end of the cylinder to the discharge end, the hulls being torn or broken off the seed between the revolving and stationary disks, which are provided with roughened surfaces of any suitable construction for the purpose of breaking or rubbing off the hulls of the seed by frictional contact.

No adjustment of any of the parts is necessary, for by placing the disks at a suitable distance apart the hulls of all the seed are torn or rubbed away before the seed can pass through the cylinder.

Placed upon the opposite end of the shaft C from the pulley D is a pulley H, from which passes a belt I up over the pulley J upon the fan-shaft L. Secured to this shaft L is the fan N, which is placed in a suitable casing O, and from which casing extends the discharge-pipe P. Extending around the cylinder B are the flues or chamber Q, and from these flues or chamber Q extend the flues R, which connect at their upper ends with the fan-casing O, which is placed at the center of the frame A above the cylinder B. The suction of the fan N is exerted through the flues Q R, so as to draw away all of the broken hulls, dust, and dirt from the grain, and the fan drives off this lighter material through the pipe P.

A closed casing V is supported in the frame A above the cylinder B and separated therefrom by the chamber Q, the purpose of which is to entirely close the inner space of the frame A with the exception of the flues R, whereby a stronger suction from the fan N is exerted upon the material as it passes from the cylinder than would be if the space which is occupied by the casing V were left vacant. The object of placing the fan above the cylinder and upon a separate shaft is to make the machine compact in form, to place it where the suction will be evenly distributed throughout the machine, to place it near the outer end of the inlet-pipe, whereby the inflowing grain will be subjected to a strong current through the medium of a short flue, and to provide a separate shaft for the fan, whereby it is driven at a higher speed than the shaft C', which is very essential in order to provide sufficient suction for the threefold operation upon the material, as before described. Also connected with the fan N is a flue S, which has its upper end to approach within any desired distance of the upper end of or an opening in the conductor C, so as to draw away the dust, dirt, and lighter portions of the grain, and thus prevent it from passing down into the cylinder. The upper end of the conductor is flared outward, as shown, and the upper end of the flue S is preferably made to extend in a line with the conductor and its end to be over the flared portion thereof, so that a suction is not caused upon the material at the upper end only of the conductor; but by reason of the end of the pipe S extending in a line therewith a suction is caused upon the material to a considerable distance down the conductor C, thus removing more thoroughly the dust and chaff from the material before it enters the cylinder than would be the case if the end of the pipe extended at an angle to the conductor.

Connected with the flues Q and S are suitable traps T, in which a portion of the dust and dirt is caught and from which it can be discharged at any time.

If so desired, the parts here shown and described may be arranged vertically instead of horizontally; but the horizontal position shown and described is preferred. Owing to the shape and arrangement of the disks F G and the automatic spring-valve which regulates the escape of the grain the grain is held in the cylinder sufficiently long to have the hull or covering of every seed broken or torn away, so that when the seed does escape from the cylinder it will be thoroughly hulled.

None of the parts of this machine being adjustable, but all being rigidly secured in position, none of the parts are liable to get out of order.

Having thus described my invention, I claim—

In a seed-hulling machine, the combination, with the outer casing, of a hulling-cylinder of less length than the said casing and supported above the bottom of the casing, whereby end and bottom flues are formed, the said bottom flue connecting with the outlet below one end of the cylinder, the closed inner casing of less length than the outer casing and supported a suitable distance above the cylinder and below the top of the said casing, whereby top flues are formed which connect with the said end flues, the suction outlet-pipe, the inner casing provided with a depression below the said outlet and which connects with the top flue, the fan placed within the depression and the outlet, and an inlet and outlet to the hulling-cylinder, substantially as shown and described.

In testimony whereof I affix my signature in presence of two witnesses.

MARTIN WILLIAM LEONHARDT.

Witnesses:
EDWARD SPANNAGELI,
HENRY RABOLD.